(12) United States Patent
Harai

(10) Patent No.: US 7,833,600 B2
(45) Date of Patent: Nov. 16, 2010

(54) DOUBLE-SIDED PRESSURE-SENSITIVE ADHESIVE SHEET

(75) Inventor: Satoshi Harai, Hachioji (JP)

(73) Assignee: 3M Innovative Properties Company, St. Paul, MN (US)

( * ) Notice: Subject to any disclaimer, the term of this patent is extended or adjusted under 35 U.S.C. 154(b) by 842 days.

(21) Appl. No.: 10/561,503

(22) PCT Filed: Jul. 27, 2004

(86) PCT No.: PCT/US2004/023945

§ 371 (c)(1),
(2), (4) Date: Dec. 19, 2005

(87) PCT Pub. No.: WO2005/019367

PCT Pub. Date: Mar. 3, 2005

(65) Prior Publication Data

US 2007/0172648 A1     Jul. 26, 2007

(51) Int. Cl.
*B32B 9/00* (2006.01)
*B32B 33/00* (2006.01)

(52) U.S. Cl. ............... 428/40.1; 428/40.9; 428/41.6
(58) Field of Classification Search ............ 428/40.1, 428/40.9, 41.1, 41.6, 41.7
See application file for complete search history.

(56) References Cited

U.S. PATENT DOCUMENTS

2004/0076768 A1   4/2004   Kamiya et al.

FOREIGN PATENT DOCUMENTS

| JP | 2002-23663 | 1/2002 |
|---|---|---|
| JP | 2002-235053 | 8/2002 |
| JP | 2002-249741 | 9/2002 |
| JP | 2002-350612 | 12/2002 |
| WO | WO 2004/028797 A1 | 4/2004 |

*Primary Examiner*—Patricia L Nordmeyer

(57) ABSTRACT

A double-sided pressure-sensitive adhesive sheet comprising a laminate containing a flexible base layer, a first black layer and second black layer and a first pressure-sensitive adhesive layer and second pressure-sensitive adhesive layer, wherein the first pressure-sensitive adhesive layer and second pressure-sensitive adhesive layer are the outermost layers on each side of the laminate.

11 Claims, 1 Drawing Sheet

DOUBLE-SIDED PRESSURE-SENSITIVE ADHESIVE SHEET

BACKGROUND

The present invention relates to a double-sided pressure-sensitive adhesive sheet, and specifically it relates to a double-sided pressure-sensitive adhesive sheet which is useful for attachment of a liquid crystal display panel with a backlight unit.

Liquid crystal display devices generally comprise a backlight unit with a light source, and a liquid crystal display panel. For miniature liquid crystal display devices used in cellular phones and the like, the backlight unit and liquid crystal display panel are normally attached by a double-sided pressure-sensitive adhesive sheet. The double-sided pressure-sensitive adhesive sheet is usually designed so as to block light onto the liquid crystal display panel side, because leakage of light onto the liquid crystal display panel side can lead to malfunction of the electronic parts or display irregularities. Providing a black pigment-containing black layer on the double-sided pressure-sensitive adhesive sheet is a commonly known means for blocking light. At the same time, double-sided pressure-sensitive adhesive sheets are preferably designed so as to be reflective onto the backlight unit side, because the light reaching the pressure-sensitive adhesive sheet can be returned to the backlight unit for reuse. A reflective layer such as a metal vapor deposition layer is a known means for conferring reflectivity to a pressure-sensitive adhesive sheet.

A sufficient light-blocking property cannot be achieved when defects such as pinholes are present in the light-blocking black layer. It is generally thought that pinholes are formed such as by foreign matter adhering to the base film. Although formation of pinholes can be prevented by creating a clean environment during formation of the black layer, it is costly to maintain a stringently clean environment. The problem of pinholes is eliminated if the thickness of the black layer is at least 10 μm, but a thick black layer increases the overall thickness of the pressure-sensitive adhesive sheet. If the thickness of the black layer is no more than 10 μm, a pinhole once formed cannot be completely covered up even by use of repeated printings to the above mentioned thickness. Thinner pressure-sensitive adhesive sheets are desired for the lowering thicknesses of liquid crystal displays for cellular phones, but it is difficult to manufacture a thin pressure-sensitive adhesive sheet having light-blocking property onto the side of liquid crystal display panel.

In consideration of this demand, Japanese Unexamined Patent Publication No. 2002-23663 discloses a pressure-sensitive adhesive sheet obtained by laminating in the following order a separator, a pressure-sensitive adhesive layer and a base sheet with at least two metal vapor deposition layers. This pressure-sensitive adhesive sheet is designed with at least two metal vapor deposition layers in order to essentially avoid defects in the light-blocking property due to pinholes or flaws in one metal vapor deposition layer. Also, Japanese Unexamined Patent Publication No. 2002-350612 discloses a plastic film having at least two metal vapor deposition layers which are used for the same purpose as Japanese Unexamined Patent Publication No. 2002-23663. However, as stated in both Japanese Unexamined Patent Publication No. 2002-23663 and Japanese Unexamined Patent Publication No. 2002-350612, the metal vapor deposition layers do not always exhibit adequate light-blocking performance, and often have pinholes. Consequently, when light from the backlight side is not blocked or passes through pinholes, etc. to penetrate the first metal vapor deposition layer, the light is then reflected by the second metal vapor deposition layer. It is thus reflected between the first metal vapor deposition layer and second metal vapor deposition layer, and part of the light fails to be blocked by the second metal vapor deposition layer as it passes through or penetrates pinholes, etc., and thus results in light leakage.

Japanese Unexamined Patent Publication No. 2002-235053 discloses a light-blocking pressure-sensitive adhesive sheet provided with a pressure-sensitive adhesive layer containing a black coloring agent on one or both sides of a base film with low light transmittance. While the pressure-sensitive adhesive sheet and plastic film of the aforementioned Japanese Unexamined Patent Publication No. 2002-23663 and Japanese Unexamined Patent Publication No. 2002-350612 are provided with two or more metal vapor deposition layers to essentially avoid defects in the light-blocking property of one metal vapor deposition layer, the primary object of the pressure-sensitive adhesive sheet disclosed in Japanese Unexamined Patent Publication No. 2002-235053 is to color the pressure-sensitive adhesive layer in order to block light reflected from the pressure-sensitive adhesive cross-section. When the pressure-sensitive adhesive sheet is used, for example, for attachment of a backlight unit with a liquid crystal display panel, it is first punched out to a suitable shape. With such a structure, the pressure-sensitive adhesive seeps out during the punching and can adversely affect the reflection performance of the pressure-sensitive sheet.

SUMMARY

According to one mode of the invention, there is provided a double-sided pressure-sensitive adhesive sheet consisting of a laminate containing a flexible base layer, a first black layer and second black layer, and a first pressure-sensitive adhesive layer and second pressure-sensitive adhesive layer, wherein the first pressure-sensitive adhesive layer and second pressure-sensitive adhesive layer are the outermost layers on each side of the laminate.

The double-sided pressure-sensitive adhesive sheet comprises at least two black layers, a first black layer and a second black layer, in order to prevent leakage of light through the pinholes or other defects of the black layers. Because the black layers are present in the form of at least two separate layers, an adequate light-blocking property is exhibited by the sheet even if the thickness of each black layer is small. As a result, the thickness of the double-sided pressure-sensitive adhesive sheet can be reduced.

DETAILED DESCRIPTION

Preferred embodiments of the present invention will now be explained in detail. The double-sided pressure-sensitive adhesive sheet of the invention may be suitably used for attachment of liquid crystal display panels and backlight units. For convenience, the invention will be explained mainly on the assumption of a double-sided pressure-sensitive adhesive sheet for a liquid crystal display, but it is to be noted that the invention is not limited to this use.

Double-sided Pressure-sensitive Adhesive Sheet

Figure 1:
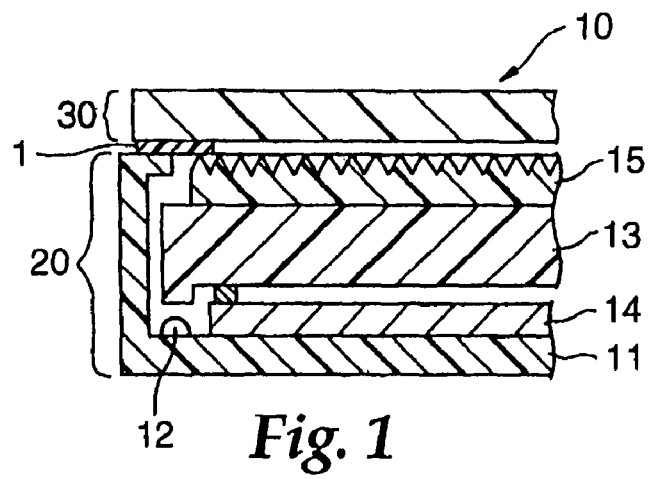
FIG. 1 shows a partial cross-section of a liquid crystal display device.

As mentioned above, the double-sided pressure-sensitive adhesive sheet of the invention is a double-sided pressure-sensitive adhesive sheet consisting of a laminate containing a flexible base layer, a first black layer and second black layer and a first pressure-sensitive adhesive layer and second pressure-sensitive adhesive layer, wherein the first pressure-sensitive adhesive layer and second pressure-sensitive adhesive layer are the outermost layers on each side of the laminate. According to the first mode, the double-sided pressure-sensitive adhesive sheet consists of a laminate containing the layers in the order: (a) first pressure-sensitive adhesive layer, (b) first black layer, (c) flexible base, (d) second black layer, and (e) second pressure-sensitive adhesive layer. This double-sided pressure-sensitive adhesive sheet may be suitably used to bond a liquid crystal display panel and backlight unit in a liquid crystal display device. FIG. 1 shows a partial cross-section view of a liquid crystal display device. The liquid crystal display device 10 has a backlight unit 20 comprising a body 11, light source 12, light guide plate 13, reflector 14 and brightness enhancing film 15, and a liquid crystal display panel 30. Light emitted from the light source 12 such as a light emitting diode passes through the light guide plate 13 and is diffused to a uniform light intensity before entering the brightness enhancing film 15. The brightness enhancing film 15 has an optical element such as a prism on its surface and increases the directivity of light incident from the light guide plate 13, resulting in enhanced brightness at the liquid crystal display panel 30. The reflector 14 is a reflecting plate which reflects light toward the liquid crystal display panel 30. The backlight unit 20 and liquid crystal display panel 30 are bonded by a double-sided pressure-sensitive adhesive sheet 1 according to the invention.

Figure 2:
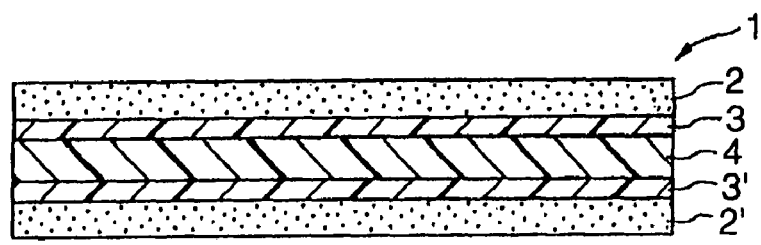
FIG. 2 shows a cross-section of one mode of the double-sided pressure-sensitive adhesive sheet of the invention.

FIG. 2 shows a cross-section of one mode of the double-sided pressure-sensitive adhesive sheet of the invention. The double-sided pressure-sensitive adhesive sheet 1 has a first pressure-sensitive adhesive layer 2, a first black layer 3, a flexible base 4, a second black layer 3' and a second pressure-sensitive adhesive layer 2'. The pressure-sensitive adhesive layer on the side adjacent to the first black layer 3 (the first pressure-sensitive adhesive layer) 2 is adhered to the liquid crystal display panel 30 side, while the pressure-sensitive adhesive layer adjacent to the second black layer 3' of the double-sided pressure-sensitive adhesive sheet (second pressure-sensitive adhesive layer) 2' is adhered to the backlight unit 20 side. Light incident to the double-sided pressure-sensitive adhesive sheet 1 from the liquid crystal display panel 30 side is absorbed by the first black layer 3 so that light to the liquid crystal display panel 30 side is blocked. This absorption at the first black layer 3 lowers the reflectance of the double-sided pressure-sensitive adhesive sheet 1 on the liquid crystal display panel 30 side, to ensure an adequate light-blocking property. This therefore prevents malfunction of the electronic parts due to light leakage, or display irregularities of the liquid crystal display due to reflection. Meanwhile, light incident to the double-sided pressure-sensitive adhesive sheet 1 from the backlight unit 20 side is almost completely absorbed in the second black layer 3' to prevent its penetration to the liquid crystal display panel 30 side. In the event of light leakage through pinholes, for example, in the second black layer 3', it is completely blocked at the first black layer 3 to prevent penetration of the light to the liquid crystal display panel 30 side.

Figure 3:
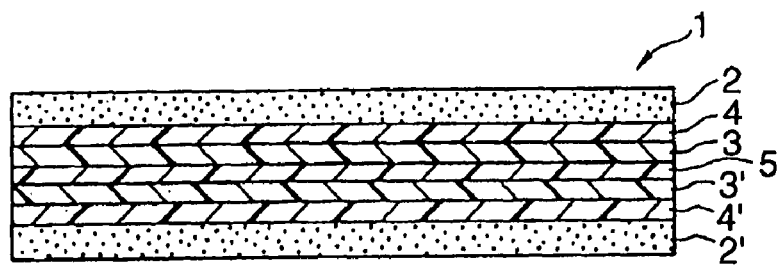
FIG. 3 shows a cross-section of another mode of the double-sided pressure-sensitive adhesive sheet of the invention.

FIG. 3 shows a cross-section of another mode of the double-sided pressure-sensitive adhesive sheet of the invention. The double-sided pressure-sensitive adhesive sheet 1 has two laminates each formed by lamination of a pressure-sensitive adhesive layer, a flexible base layer and a black layer in that order, and these are attached by dry lamination so as to form a double-sided pressure-sensitive adhesive sheet 1 of the invention consisting of a laminate containing a first pressure-sensitive adhesive layer 2, a first flexible base layer 4, a first black layer 3, a lamination layer 5, a second black layer 3', a second flexible base layer 4' and a second pressure-sensitive adhesive layer 2'. The lamination layer 5 may be any means suitable for bonding laminates together, and for example, the bonding may be accomplished by dry lamination using a hot-melt adhesive. A dry lamination layer will usually be a very thin layer of approximately 2 μm.

Figure 4:
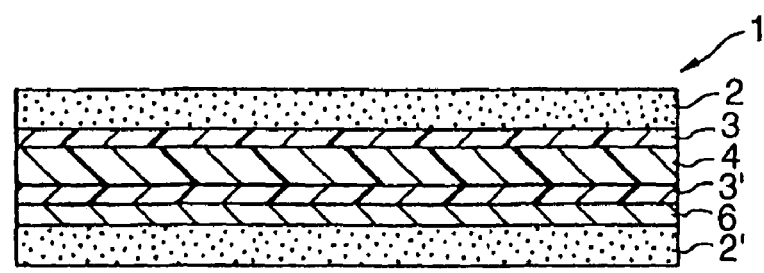
FIG. 4 shows a cross-section of another mode of the double-sided pressure-sensitive adhesive sheet of the invention.

FIG. 4 shows a cross-section of another mode of the double-sided pressure-sensitive adhesive sheet of the invention. This double-sided pressure-sensitive adhesive sheet further comprises a reflective layer 6. Light incident to the double-sided pressure-sensitive adhesive sheet 1 from the backlight unit 20 side is reflected at the reflective layer 6 and the reflected light is reutilized for illumination of the liquid crystal display panel 30. The reflection at the reflective layer 6 also has the function of blocking light onto the liquid crystal display panel 30 side.

Pressure-sensitive Adhesive Layer

The first pressure-sensitive adhesive layer and second pressure-sensitive adhesive layer are not particularly restricted so long as provide sufficient adhesive strength for the double-sided pressure-sensitive adhesive sheet, and any pressure-sensitive adhesive such as an acrylic-based pressure-sensitive adhesive, silicone-based pressure-sensitive adhesive, poly-alpha-olefin-based pressure-sensitive adhesive, polyurethane based pressure-sensitive adhesive, rubber/resin based pressure-sensitive adhesive, block copolymer-based pressure-sensitive adhesive or polyester-based pressure-sensitive adhesive may be used. The pressure-sensitive adhesive may further contain additives such as silanes, fillers, or microspheres, etc. In most cases, there will be used an acrylic-based pressure-sensitive adhesive with high transparency for light of the wavelength of the backlight unit light source, and high adhesive strength at relatively low thicknesses. When the double-sided pressure-sensitive adhesive sheet of the invention is used for bonding of the display panel and backlight unit of a miniature liquid crystal display device such as for a cellular phone, the pressure-sensitive adhesive layer is preferably as thin as possible in order to achieve greater thinness, but a thickness of the adhesive layer is preferably 1 μm or greater, more preferably 10 μm or greater, even more preferably 20 μm or greater for sufficient bonding strength. However, a thickness of the pressure-sensitive adhesive layer is preferably controlled to render a double-sided pressure-sensitive adhesive sheet to have a thickness of 60 μm or less for a thinning of liquid crystal display panel as required in the cellar phone.

Flexible Base

The flexible base acts as a support for the black layers while conferring flexibility to the double-sided pressure-sensitive adhesive sheet. A plastic film may be used as the flexible base, and preferred plastic films include, for example, polypropylene films, polyethylene terephthalate (PET) films and polycarbonate films from the standpoint of cost, PET films, polyethylene naphthalate (PEN) films and polycarbonate films from the standpoint of satisfactory properties such as heat resistance and dimensional stability, with PET films being particularly preferred for cost and other considerations. The flexible base is preferably thin in order to minimize the overall thickness of the double-sided pressure-sensitive adhesive sheet, but when polyethylene terephthalate is used, it will normally be at least 8 µm and more commonly at least 10 µm from the viewpoint of properties such as strength, heat resistance, and dimensional stability. When a plurality of flexible bases are used, such as in FIG. 3 where two flexible bases, a first flexible base and a second flexible base, are used, the total thickness of the layers of the flexible bases will usually be at least 8 µm and more commonly at least 10 µm. However, a total thickness of flexible base layers is preferably controlled to render a double-sided pressure-sensitive adhesive sheet to have a thickness of 60 µm or less for a thinning of liquid crystal display panel as required in the cellar phone. The flexible base may be a filler or pigment-containing flexible base in order to color the flexible base in white, black or other colors.

Black Layer

The black layer is a combination of a first black layer and a second black layer. The first black layer functions to absorb light incident to the double-sided pressure-sensitive adhesive sheet from the liquid crystal display panel side, and also blocks light to the liquid crystal display panel side. The first black layer also lowers the reflectance on the liquid crystal display panel side, to ensure an adequate light-blocking property. This therefore prevents malfunction of the electronic parts due to light leakage, or display irregularities of the liquid crystal display due to reflection. Meanwhile, light incident to the double-sided pressure-sensitive adhesive sheet from the backlight unit side is almost completely absorbed in the second black layer to prevent its penetration to the liquid crystal display panel side. In the event of light leakage through pinholes, for example, in the second black layer, it is completely blocked at the first black layer to prevent penetration of the light to the liquid crystal display panel side.

The black layers may be formed by coating and drying a paint containing a coloring agent such as a black dye or pigment onto the flexible base. As examples of black coloring agents, there may be mentioned black inorganic pigments or dyes or organic pigments or dyes, and examples thereof include carbon black, acetylene black, lamp black, bone black, graphite, iron black, mineral black, aniline black, cyanine black and the like. Black inks obtained by dispersing such black coloring agents with polymer-based dispersing agents, for example, common black inks used for various purposes such as planographic printing inks, gravure printing inks, relief printing inks, screen printing inks, flexo printing inks, intaglio printing inks, special printing inks and the like, may be used as the aforementioned paint. The black layer may be formed using appropriate means such as gravure printing, reverse printing or the like. However, a total thickness of black layers is preferably controlled to render a double-sided pressure-sensitive adhesive sheet to have a thickness of 60 µm or less for a thinning of liquid crystal display panel as required in the cellar phone.

There are no particular restrictions on the thickness of the black layers, but normally each black layer will provide an adequate light-blocking property with a thickness of 1 µm or greater. If light leakage occurs due to pinholes in either the first or second black layer, then this level of thickness will allow the other black layer to block the light. Thus, whereas conventionally the black layer has been formed in an extremely clean environment or at a thickness of 10 µm or greater to ensure complete blockage of light by a single black layer, provision of a first black layer and a second black layer provides an adequate light-blocking property even with a very thin total thickness (for example, 2-5 µm) and without requiring maintenance of a stringent clean environment.

Reflective Layer

The double-sided pressure-sensitive adhesive sheet of the invention may optionally have a reflective layer. The reflective layer reflects light incident to the double-sided pressure-sensitive adhesive sheet from the backlight unit side, to allow its reuse for illumination of the liquid crystal display panel. Normally, the reflective layer may be provided on the black layer by forming a white reflective layer such as a white film or white printed layer, or a metal layer such as aluminum or silver. As examples of white films, there may be mentioned plastic films containing white pigments such as titanium dioxide or calcium carbonate. The white film may be bonded to the black layer via a dry lamination layer such as described above. Alternatively, when the reflective layer is a white printed layer, a paint containing a white pigment such as titanium dioxide or calcium carbonate may be formed by coating in the same manner as the aforementioned black layer. A white printed layer may be formed by direct printing on the black layer. Alternatively, a white printed layer may be formed on a thin flexible film and the flexible film bonded with the black layer via a dry lamination layer, or the white printed layer and black layer may be bonded via a dry lamination layer. There are no particular restrictions on the thickness, but a white film will normally be 10-15 µm, and a white printed layer will normally be 1-2 µm. A flexible film serving as the support for a white printed layer will normally be 4-12 µm. A dry lamination layer will usually be a very thin layer of about 2 µm using a hot-melt adhesive.

The reflective layer may also be a metal layer. The reflective layer is preferably a silver layer in order to obtain high reflectivity. A silver layer may be formed by a wet method or dry method. A wet method is generally plating, whereby a silver film may be formed by deposition of silver from a solution. More specifically, there may be mentioned the silver mirror reaction. On the other hand, a dry method is generally vacuum film formation, and specific examples thereof include resistance heating vacuum vapor deposition, electron beam heating vacuum vapor deposition, ion plating, ion beam assist vacuum vapor deposition, sputtering and the like. Most preferred for the present invention is a vacuum film forming method using a roll-to-roll system for continuous film formation.

The thickness of a silver layer may be a thickness sufficient to give a high reflectance of 90% or greater and preferably 95% or greater. In order to realize such a high reflectance, the silver layer is preferably 0.3-0.5 µm. If the thickness of the silver layer is less than 0.3 µm, sufficient high reflectance cannot be achieved, while no further effect of enhanced reflectance can be expected even if it exceeds 0.5 µm. The term "reflectance" as used throughout the present specification is the mean value of the reflectance for light of a wavelength of 380-780 nm.

Even when the reflective layer is a metal layer, it may be formed in the double-sided pressure-sensitive adhesive sheet in the same manner as a white printed layer. That is, the metal layer may be formed by direct vapor deposition on the black layer. Alternatively, it may be formed by means such as vapor deposition of the metal layer on a thin flexible film and bonding of the flexible film and black layer via a dry lamination layer, or by bonding of the metal layer and black layer via a dry lamination layer.

Fabrication of Double-sided Pressure-sensitive Adhesive Sheet

The double-sided pressure-sensitive adhesive sheet of the invention may be easily fabricated by referring to the above description. First, a paint containing carbon black is coated and dried onto a suitable flexible base such as a polyethylene terephthalate (PET) film to form a black layer on the flexible base. A black layer is likewise formed on the side of the flexible base opposite this black layer. If necessary, a silver layer may be formed by appropriate means such as vacuum vapor deposition to form a reflective layer. Each of the black layers (and silver layers if present) on both sides of the flexible base are then coated with a pressure-sensitive adhesive layer using appropriate means such as bar coating, Meyer bar coating, reverse coating, gravure coating or die coating, to obtain a double-sided pressure-sensitive adhesive sheet according to the invention, of the type shown in FIG. 2 or 3. A double-sided pressure-sensitive adhesive sheet of the type shown in FIG. 4 may also be obtained by forming two laminates comprising the pressure-sensitive adhesive layer, flexibility base and black layer, and dry laminating the black layers together. The thickness of each layer of the double-sided pressure-sensitive adhesive sheet may be selected from the respective thicknesses mentioned above. When a double-sided pressure-sensitive adhesive sheet comprises light-blocking black layers with or without a reflective layer, it may have a total thickness of no more than 60 μm and a thin sheet of about 50 μm may be obtained. Even when a double-sided pressure-sensitive adhesive sheet comprises a white film as a reflective layer, that is, comprises light-blocking layers with a white film reflective layer, it may have a total thickness of 85 μm or less.

Lamination Examples of Double-sided Pressure-sensitive Adhesive Sheets

Lamination examples of double-sided pressure-sensitive adhesive sheet can be the following examples including the above mentioned lamination examples:

1. A double-sided pressure-sensitive adhesive sheet comprising, in the following order, a first pressure-sensitive adhesive layer, a first black layer, a flexible base layer, a second black layer and a second pressure-sensitive adhesive layer.
2. A double-sided pressure-sensitive adhesive sheet comprising, in the following order, a first pressure-sensitive adhesive layer, a first flexible base layer, a first black layer, a lamination layer, a second black layer, a second flexible base layer and a second pressure-sensitive adhesive layer.
3. A double-sided pressure-sensitive adhesive sheet comprising, in the following order, a first pressure-sensitive adhesive layer, a first black layer, a flexible base layer, a second black layer, a reflective layer and a second pressure-sensitive adhesive layer.
4. A double-sided pressure-sensitive adhesive sheet comprising, in the following order, a first pressure-sensitive adhesive layer, a first black layer, a first flexible base layer, a second black layer, a lamination layer, a second flexible base layer, a reflective layer and a second pressure-sensitive adhesive layer.
5. A double-sided pressure-sensitive adhesive sheet comprising, in the following order, a first pressure-sensitive adhesive layer, a first black layer, a first flexible base layer, a second black layer, a lamination layer, a reflective layer, a second flexible base layer and a second pressure-sensitive adhesive layer.
6. A double-sided pressure-sensitive adhesive sheet comprising, in the following order, a first pressure-sensitive adhesive layer, a first flexible base layer, a first black layer, a lamination layer, a second black layer, a second flexible base layer, a reflective layer and a second pressure-sensitive adhesive layer.
7. A double-sided pressure-sensitive adhesive sheet comprising, in the following order, a first pressure-sensitive adhesive layer, a first flexible base layer, a first black layer, a lamination layer, a second black layer, a reflective layer, a second flexible base layer and a second pressure-sensitive adhesive layer.
8. A double-sided pressure-sensitive adhesive sheet comprising, in the following order, a first pressure-sensitive adhesive layer, a first black layer, a first flexible base layer, a lamination layer, a second black layer, a reflective layer, a second flexible base layer and a second pressure-sensitive adhesive layer.
9. A double-sided pressure-sensitive adhesive sheet comprising, in the following order, a first pressure-sensitive adhesive layer, a first black layer, a first flexible base layer, a lamination layer, a second black layer, a second flexible base layer, a reflective layer and a second pressure-sensitive adhesive layer.
10. A double-sided pressure-sensitive adhesive sheet comprising, in the following order, a first pressure-sensitive adhesive layer, a first flexible base layer, a first black layer, a lamination layer, a second flexible base layer, a second black layer, a reflective layer and a second pressure-sensitive adhesive layer.
11. A double-sided pressure-sensitive adhesive sheet comprising, in the following order, a first pressure-sensitive adhesive layer, a first black layer, a first flexible base layer, a lamination layer, a second flexible base layer, a second black layer, a reflective layer and a second pressure-sensitive adhesive layer.

Use of Double-sided Pressure-sensitive Adhesive Sheet

The double-sided pressure-sensitive adhesive sheet of the invention may be suitably used as a pressure-sensitive adhesive sheet for bonding of, for example, liquid crystal display panels and backlight units in miniature liquid crystal display devices of cellular phones, digital cameras, video cameras and the like.

| EXPLANATION OF SYMBOLS | |
|---|---|
| 1 | Double-sided pressure-sensitive adhesive sheet |
| 2 | Pressure-sensitive adhesive layer |
| 3 | Black layer |
| 4 | Flexible base layer |
| 5 | Lamination layer |
| 6 | Reflective layer |
| 10 | Liquid crystal display device |
| 11 | Body |
| 12 | Light source |
| 13 | Light guide plate |
| 14 | Reflector |
| 15 | Brightness enhancing film |
| 20 | Backlight unit |
| 30 | Liquid crystal display panel |

EXAMPLES

Example 1

Both sides of a polyethylene terephthalate (PET) film (12 µm thickness) were coated with black ink composed of HAIMILAC 795R ink (available from Dainichiseika Color & Chemicals Mfg. Co., Ltd.) by gravure printing, and then dried to form 1.5 µm-thick black printed layers (one printing of black ink). One black printed side of the base was then coated with an acrylic-based pressure-sensitive adhesive (BPS5213KOP, product of Toyo Ink Mfg. Co., Ltd.) using a comma coater, and dried at 65° C. for 5 minutes to form a pressure-sensitive adhesive layer (20 µm thickness). A comma coater is one of conventional knife coaters whose roll is partly cut in order to prevent uneven coating thickness caused by high viscosity of the coating solution or high speed of coating, or in order to improve precision of manufacturing. Since the cross-sectional shape of the partly cut roll looks like the symbol "comma", it is called as a comma coater. After drying, a release film was laminated onto the pressure-sensitive adhesive layer (A50 liner, product of Teijin-DuPont Film Co., Ltd.). A pressure-sensitive adhesive layer was also formed on the opposite side of the base using the same pressure-sensitive adhesive under the same conditions, and a release film was laminated thereover. This produced a double-sided pressure-sensitive adhesive sheet (55 µm) according to the invention comprising a pressure-sensitive adhesive layer (20 µm)/black printed layer (1.5 µm)/PET film layer (12 µm)/black printed layer (1.5 µm)/pressure-sensitive adhesive layer (20 µm) laminate, having both sides protected with release films.

Comparative Example 1

A double-sided pressure-sensitive adhesive sheet was formed in the same manner as Example 1 by coating the same black ink as in Example 1 by gravure coating to form a black printed layer after drying, and coating thereon the same ink by gravure coating to form a black printed layer after drying, but a total of 3 µm-thick black printed layer was formed on only one side of the PET film (two printings of black ink). This produced a double-sided pressure-sensitive adhesive sheet (55 µm) comprising a pressure-sensitive adhesive layer (20 µm)/PET film layer (12 µm)/black printed layer (3 µm)/pressure-sensitive adhesive layer (20 µm) laminate, having both sides protected with release films.

Comparative Example 2

A double-sided pressure-sensitive adhesive sheet was formed in the same manner as Comparative Example 1, but four printings of black ink were effected (coating and drying step was effected four times) and the total thickness of the black printed layer was 5 µm. This produced a double-sided pressure-sensitive adhesive sheet (57 µm) comprising a pressure-sensitive adhesive layer (20 µm)/PET film layer (12 µm)/black printed layer (5 µm)/pressure-sensitive adhesive layer (20 µm) laminate, having both sides protected with release films.

Comparative Example 3

A double-sided pressure-sensitive adhesive sheet was formed in the same manner as Comparative Example 1, but the total thickness of 10 µm of the black printed layer was formed by reverse printing to form a 5 µm thick black printed layer and a further reverse printing. This produced a double-sided pressure-sensitive adhesive sheet (62 µm) comprising a pressure-sensitive adhesive layer (20 µm)/PET film layer (12 µm)/black printed layer (10 µm)/pressure-sensitive adhesive layer (20 µm) laminate, having both sides protected with release films.

Comparative Example 4

A double-sided pressure-sensitive adhesive sheet was formed in the same manner as Example 1, except that an aluminum layer (0.5 µm each) was formed by vacuum vapor deposition on both sides of the polyethylene terephthalate (PET) film (12 µm thickness). This produced a double-sided pressure-sensitive adhesive sheet (53 µm) comprising a pressure-sensitive adhesive layer (20 µm)/aluminum layer (0.5 µm)/PET film layer (12 µm)/aluminum layer (0.5 µm)/pressure-sensitive adhesive layer (20 µm) laminate, having both sides protected with release films.

1. Measurement of Light Transmittance

The light transmittance of each of the double-sided pressure-sensitive adhesive sheets manufactured in the examples and comparative examples was measured. The light transmittance was measured by scanning with a wavelength of 380-780 nm at a scan rate of 300 nm/min, using a U-400 spectrophotometer by Hitachi Laboratories Co., Ltd. The results are shown in Table 1 below, as the mean values of measurement in the above-mentioned wavelength range.

2. Confirmation of Light-blocking Property for LED Light Source

The pressure-sensitive adhesive sheet cut to a size of 10 cm square was placed over a "27 W fluorescent lamp" in a darkroom and the light-blocking property was visually confirmed. Samples which allowed absolutely no fluorescent lamp light to be seen were evaluated as O, and samples which allowed some fluorescent lamp light to be seen were evaluated as X. The results are shown in Table 1 below.

3. Confirmation of Pinholes

The pressure-sensitive adhesive sheet cut to a size of 10 cm square was placed over a "27 W fluorescent lamp" in a darkroom and the number of pinholes was visually counted. The results are shown in Table 1 below.

TABLE 1

| | Light-blocking system | Double-sided pressure-sensitive adhesive sheet thickness (µm) | Light transmittance (%) | LED light source-blocking property | Number of pinholes |
|---|---|---|---|---|---|
| Example 1 | double-sided black gravure printing | 55 | 0.00 | O | 0 |
| Comp. Ex. 1 | one-sided black gravure printing | 55 | 0.00 | X | 10< |
| Comp. Ex. 2 | one-sided black gravure printing | 57 | 0.00 | X | 10< |
| Comp. Ex. 3 | one-sided black reverse printing | 62 | 0.00 | O | 0 |
| Comp. Ex. 4 | double-sided aluminum vapor deposition | 53 | 0.01 | X | 0 |

What claim is:

1. A double-sided pressure-sensitive sheet comprising, in the following order, a first pressure-sensitive adhesive layer, a first black layer, a flexible base layer, a second black layer, and a second pressure-sensitive adhesive layer, wherein said first pressure-sensitive adhesive layer and second pressure-sensitive adhesive layer are the outermost layers on either side of the double-sided pressure-sensitive sheet, and wherein the thickness of the double-sided pressure-sensitive sheet is no greater than 60 µm.

2. A double-sided pressure-sensitive adhesive sheet according to claim 1, wherein said first black layer and second black layer are black printed layers formed on each side of the flexible base layer.

3. A double-sided pressure-sensitive adhesive sheet according to claim 1, wherein said laminate further comprises a reflective layer situated between the second black layer and the second pressure-sensitive adhesive layer.

4. A double-sided pressure-sensitive adhesive sheet according to claim 3, wherein said reflective layer is a metal layer.

5. A double-sided pressure-sensitive adhesive sheet according to claim 3, wherein said reflective layer is a white film.

6. A double-sided pressure-sensitive adhesive sheet according to claim 3, wherein said reflective layer is a white printed layer.

7. A double-sided pressure-sensitive sheet comprising, in the following order, a first pressure-sensitive adhesive layer, a first flexible base layer, a first black layer, a lamination layer, a second black layer, a second flexible base layer, and a second pressure-sensitive adhesive layer, wherein said first pressure-sensitive adhesive layer and said second pressure-sensitive adhesive layer are the outermost layers on either side of the double-sided pressure-sensitive sheet, and wherein the thickness of the double-sided pressure-sensitive sheet is no greater than 60 µm.

8. A double-sided pressure-sensitive adhesive sheet according to claim 7, wherein said double-sided pressure-sensitive sheet further comprises a reflective layer situated between the second black layer and the second pressure-sensitive adhesive layer.

9. A double-sided pressure-sensitive adhesive sheet according to claim 8, wherein said reflective layer is a metal layer.

10. A double-sided pressure-sensitive adhesive sheet according to claim 8, wherein said reflective layer is a white film.

11. A double-sided pressure-sensitive adhesive sheet according to claim 8, wherein said reflective layer is a white printed layer.

* * * * *